(12) United States Patent
Ezaki (10) Patent No.: US 6,594,485 B1
(45) Date of Patent: Jul. 15, 2003

(54) MOBILE TERMINAL, COMMUNICATION SYSTEM FOR THE SAME AND METHOD OF RE-CONNECTION IN THE SAME

(75) Inventor: Kazuhiko Ezaki, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/418,329

(22) Filed: Oct. 14, 1999

(30) Foreign Application Priority Data

Oct. 16, 1998 (JP) .......................................... 10-295188

(51) Int. Cl.[7] ................................................ H04M 3/42
(52) U.S. Cl. ........................ 455/417; 455/423; 455/424; 455/425; 455/445
(58) Field of Search ................................ 455/414, 417, 455/421, 423, 424, 425, 445, 466, 560, 561

(56) References Cited

U.S. PATENT DOCUMENTS

| | | | |
|---|---|---|---|
| 5,953,657 A | * | 9/1999 | Ghisler ........................ 455/414 |
| 5,960,348 A | * | 9/1999 | Eisdorfer et al. ............ 455/445 |
| 5,995,830 A | * | 11/1999 | Amin et al. ................. 455/423 |
| 6,192,239 B1 | * | 2/2001 | Lee et al. .................... 455/421 |

FOREIGN PATENT DOCUMENTS

| | | |
|---|---|---|
| EP | 0 526 240 A2 | 2/1993 |
| EP | 0 871 316 A1 | 10/1998 |
| GB | 2 297 455 A | 7/1996 |
| JP | 5-284091 | 10/1993 |
| JP | 6-78075 | 3/1994 |
| JP | 6-315006 | 11/1994 |
| JP | 8-307949 | 11/1996 |
| JP | 9-261154 | 10/1997 |

* cited by examiner

Primary Examiner—Lester G. Kincaid
Assistant Examiner—Ronald J. Ward
(74) Attorney, Agent, or Firm—Scully, Scott, Murphy & Presser (57) ABSTRACT

A mobile terminal, communication system for the same, and a method for reconnecting the mobile terminal by transmitting a telephone number determined by a user of the mobile terminal through to a second terminal, the telephone number being defined as a number to which the second terminal is to be reconnected in a situation where it becomes impossible for the second terminal to communicate with the first mobile terminal, when a line between the mobile terminal and a radio base station to which the mobile terminal is connected is abruptly interrupted and the line does not return to a normal state.

3 Claims, 7 Drawing Sheets

MOBILE TERMINAL, COMMUNICATION SYSTEM FOR THE SAME AND METHOD OF RE-CONNECTION IN THE SAME

BACKGROUND OF THE INVENTION

1. Field of the Invention

The invention relates to a mobile terminal, communication system using the mobile terminal, and a method of re-connecting a line of the mobile terminal in the communication system, and more particularly to such a mobile terminal, communication system, and a method all of which are capable of accomplishing various functions by sharing data stored by terminals with one another through radio signals.

2. Description of the Related Art

In communication system for mobile terminals which system shares data stored in mobile terminals through radio signals to thereby accomplish various functions, such as simplified portable radio telephone system, since state of radio signals through which a mobile terminal makes communication with a radio base station always varies, it is physically impossible to ensure stable communication, and communication may be interrupted at worst. Hence, the above-mentioned conventional communication system attempts to reduce an area which radio signals can scarcely reach, by increasing the number of radio base stations.

In addition, temporary disconnection between a mobile terminal and a radio base station occurs when a mobile terminal passes through an area in which an electric field is locally weak even in a service area, such as intermediate area between buildings and a tunnel in a high-way in an urban area. When a mobile terminal is re-connected after such disconnection has occurred, there is caused a problem that it is not always clear as to which of a mobile terminal and a radio base station should give a call to an opponent, and if both simultaneously attempts to re-connect a line to each other, both cannot be connected to each other.

In order to solve such a problem, Japanese Unexamined Patent Publication No. 5-284091 has suggested communication system in which a mobile terminal is designed to transmit information indicating that the mobile terminal would give a call again immediately after the mobile terminal has passed over an area where an electric field is weakened.

Japanese Unexamined Patent Publication No. 6-315006 has suggested another communication system for mobile terminals. In the suggested communication system, when interruption occurs in radio signals between a mobile terminal and a radio base station, such interruption is informed of an interchange station in mobile network. While the mobile network reserves a call, a mobile terminal or a base station keeps transmitting specific message. When the base station or the mobile terminal receives such specific message, the interchange station in mobile network is informed of such receipt from the base station or the mobile terminal, and then, re-connects a line for the reserved call. Thus, re-connection in a line is carried out immediately after a mobile terminal has passed a blind zone.

However, the above-mentioned conventional communication system which attempts to reduce a blind zone by increasing the number of radio base stations is accompanied with problems that an operator who builds radio base stations has to receive too heavy economic burden, and that stable communication in radio signals cannot always be ensured even if the number of radio base stations is increased, since radio signal condition is varied due to various external factors.

In addition, if abrupt interruption in radio signals occurs, a mobile terminal user usually cannot make further communication after such interruption.

Though the communication system suggested in Japanese Unexamined Patent Publication No. 5-284091 carries out the step of transmitting information indicating that the mobile terminal would give a call again immediately after the mobile terminal has passed over an area where an electric field is weakened, when the mobile terminal dials to an opponent terminal, it is impossible for the mobile terminal to make communication with the opponent terminal unless the mobile terminal passes over the blind zone.

It is also impossible for the communication system suggested in Japanese Unexamined Patent Publication No. 6-315006 to make communication, unless a radio base station or a mobile terminal detects the specific message.

In addition, it is impossible for the communication systems suggested in the above-mentioned Publications to make communication, unless a line in radio signals between a radio base station and a mobile terminal returns into normal condition.

Japanese Unexamined Patent Publication No. 6-78075 has suggested communication system to be mounted in an automobile. In the suggested communication system, if a key-lock signal is transmitted while an operation section is being handled, a control section transmits a reservation requesting signal to a data center, and interrupts telephone lines. State just before interruption of the telephone lines is stored in both a storage section of the system and a storage section in the data center. The control section transmits a reservation releasing signal to the data center for re-connection of the telephone lines after transmission of the key-lock signal has been stopped. Then, a menu screen of the state detected just before interruption of the telephone lines is displayed, based on data stored in the storage sections. The data center is transferred into a state detected just before interruption of the telephone lines. In accordance with the communication system, it is no longer necessary to re-start the operation for selection.

Japanese Unexamined Patent Publication No. 8-307949 has suggested communication system for re-connecting mobile terminals. When a user of a calling terminal or a called terminal interrupts connection in a line, communication is ceased. If communication is ceased without interruption being made by a user, the calling terminal gives a call again to the called terminal without a ringer of the called terminal being rung. The called terminal automatically responds to the calling terminal, even if a user of the called terminal carries out a step necessary for responding to a call, thereby a line between the terminals is connected again.

Japanese Unexamined Patent Publication No. 9-261154 has suggested radio signal communication system. In the suggested communication system, a mobile terminal can make communication with a first base station in a first radio signal zone through a first line having a narrow band, and further can make communication with second and third base stations in second and third radio signal zones through a second line having a wide band. Audio data is transmitted through the first line, and graphic data is transmitted through the second line. Both the audio and graphic data is provided with time stamp for establishing synchronization between audio and graphic data. When the second line is interrupted, the graphic data is ceased to transmit. When the second line is recovered, a location at which the graphic data starts to be transmitted is determined by virtue of the time stamp of the audio data having been received in the first line at the time of recovery of the second line. Thereafter, the graphic data is transmitted through the second line.

The above-mentioned problems remain unsolved even in the communication systems suggested in the above-mentioned Publications

SUMMARY OF THE INVENTION

In view of the above-mentioned problems, it is an object of the present invention to provide a mobile terminal, communication system using the same, and a method of re-connecting the mobile terminal, all of which are capable of ensuring communication for a user of a mobile terminal even when a line between a mobile terminal and a radio base station is abruptly interrupted and the line does not return to normal state.

In one aspect of the present invention, there is provided a communication system for mobile terminals, including (a) a first mobile terminal, (b) a first radio base station to which the first mobile terminal is connected through radio signals, (c) a second terminal, and (d) a control station through which the first radio base station is connected to the second terminal, the first mobile terminal including an informer which informs the first radio base station of a first telephone number when the first mobile terminal makes communication with the first radio base station, the first telephone number being determined by a user at his/her discretion and being defined as a telephone number to which the second terminal is re-connected when it becomes impossible for the second terminal to make communication with the first mobile terminal, the control station including a memory in which the first telephone number having been notified from the first radio base station is to be stored, the first radio base station including a first informer which informs the control station of disconnection between the first mobile terminal and the first radio base station when connection between the first mobile terminal and the first radio base station is interrupted while the first mobile terminal is in communication with the second terminal, the second terminal including a first annunciator which is controlled by the control station having been informed of the disconnection and annunciates a user of the second terminal to thereby urge a user of the second terminal to dial the first telephone number, the second terminal further including means for giving a call to the first telephone number when a user of the second terminal dials the first telephone number.

In accordance with the above-mentioned communication system, the first annunciator annunciates a user of the second terminal to thereby urge a user of the second terminal to dial the first telephone number, when disconnection between the first mobile terminal and the first radio base station is detected while the first mobile terminal is in communication with the second terminal. Hence, when the first mobile terminal cannot make communication with the second terminal, it is possible to connect a line between the second terminal and a terminal having the first telephone number, if the second terminal dials the first telephone number.

It is preferable that the second terminal is selected as a mobile terminal in mobile network or a fixed terminal in public network.

It is preferable that the communication system for mobile terminals further includes a second radio base station connected to the control station, and wherein the second terminal is a second mobile terminal connected to the second radio base station through radio signals, the second mobile terminal including an informer which informs the second radio base station of a second telephone number when the second mobile terminal makes communication with the second radio base station, the second telephone number being determined by a user at his/her discretion and being defined as a telephone number to which the first mobile terminal is re-connected when it becomes impossible for the first mobile terminal to make communication with the second terminal, the second radio base station including a second informer which informs the control station of disconnection between the second mobile terminal and the second radio base station when connection between the second mobile terminal and the second radio base station is interrupted while the second terminal is in communication with the first mobile terminal, the first mobile terminal including a second annunciator which is controlled by the control station having been informed of the disconnection and annunciates a user of the first mobile terminal to thereby urge a user of the first mobile terminal to dial the second telephone number, the first mobile terminal further including means for giving a call to the second telephone number when a user of the first mobile terminal dials the second telephone number, the memory of the control station storing the second telephone number having been informed of from the second radio base station, the first and second mobile terminals each including a memory for storing the first and second telephone numbers of the first and second mobile terminals.

In accordance with the above-mentioned communication system, the second annunciator annunciates a user of the first mobile terminal to thereby urge a user of the first mobile terminal to dial the second telephone number, when disconnection between the second terminal and the second radio base station is detected. Hence, when the second terminal cannot make communication with the first mobile terminal, it is possible to connect a line between the first mobile terminal and a terminal having the second telephone number, if the first mobile terminal dials the second telephone number.

It is preferable that the first telephone number is a telephone number of a fixed terminal which is other than the first mobile terminal and the second terminal.

It is preferable that a terminal having the first telephone number has a function of recording therein messages transmitted from the second terminal.

It is preferable that the first mobile terminal has a function of recording therein messages transmitted from the second terminal, the first mobile terminal has the first telephone number, the means for dialing to the first telephone number connects a line to a message recording center to thereby record messages transmitted from the second terminal.

It is preferable that the first mobile terminal dials to the first telephone number without being handled to do so, when a predetermined period of time has passed after detection of disconnection between the first mobile terminal and the first radio base station.

In another aspect of the present invention, there is provided a mobile terminal which makes radio communication with a radio base station and also makes radio communication with an opponent terminal in mobile network or in public network through a control station to which the radio base station is connected, including (a) a memory including a first area in which a first telephone number is to be stored and a second area in which a second telephone number is to be stored, the first telephone number being determined by a user of the mobile terminal at his/her discretion and being defined as a telephone number to which the opponent terminal is re-connected when it becomes impossible for the opponent terminal to make communication with the mobile terminal, the second telephone number being determined by a user of the opponent terminal at his/her discretion and being defined as a telephone number to which the mobile terminal is re-connected when it becomes impossible for the mobile terminal to make communication with the opponent terminal, (b) a controller which (b1) transmits the first telephone number to the radio base station when the mobile terminal makes communication with the radio base station, (b2) stores the second telephone number in the second area which number has been transmitted from the opponent terminal after the mobile terminal has been connected to the opponent terminal, (b3) controls the mobile terminal to start communication with the opponent terminal after the second telephone number has been stored in the second area, and (b4) temporarily stops transmitting radio signals to the radio base station when slot error has continued for a predetermined period of time in signals received from the radio base station, and (c) an annunciator which annunciates information to a user of the mobile terminal to thereby urge a user of the mobile terminal to dial the second telephone number, when informed from the radio base station that disconnection between the mobile terminal and the opponent terminal is other than normal disconnection.

It is preferable that the controller controls the mobile terminal to dial the second telephone number without being handled to do so, when a predetermined period of time has passed after the information has been annunciated.

It is preferable that the controller inserts the first telephone number into sub-address data included in a signal for giving a call, transmits a user-inherent sub-address indicated by a sub-address identifying bit for informing that the sub-address data is used as an area for indicating the first telephone number, and extracts the second telephone number out of received data bit of a control channel to thereby store the thus extracted second telephone number in the second area.

In still another aspect of the present invention, there is provided a method of re-connecting a mobile terminal to an opponent terminal through a radio base station which is connected to a control station, including the steps of (a) informing the radio base station of a first telephone number when the mobile terminal makes communication with the radio base station, the first telephone number being determined by a user of the mobile terminal at his/her discretion, (b) informing the opponent terminal of the first telephone number through the radio base station and the control station when the opponent terminal is called, (c) storing a second telephone number transmitted from the opponent terminal, after connection between the mobile terminal and the opponent terminal has been established, the second telephone number being determined by a user of the opponent terminal at his/her discretion, (d) starting communication between the mobile terminal and the opponent terminal, (e) sending messages to the opponent terminal for urging dialing the first telephone number after disconnection sequence has been carried out in the opponent terminal, when disconnection between the mobile terminal and the radio base station has been detected while communication is being made therebetween, and (f) connecting the opponent terminal to the first telephone number when the first telephone number is dialed in the opponent terminal.

In the above-mentioned method, the first and second telephone numbers having been interchanged in the above-mentioned communication system are stored in the first and second mobile terminals. Hence, when abrupt interruption in a telephone line has occurred, a user can dial the first or second telephone number, which ensures a user to make systematic use of the communication system.

There is further provided a method of re-connecting a mobile terminal to an opponent terminal, including the step of connecting the mobile terminal to a first telephone number having been determined in advance by the opponent terminal when disconnection other than normal disconnection occurs between the mobile terminal and the opponent terminal.

It is preferable that the above-mentioned method further includes the step of connecting the opponent terminal to a second telephone number having been determined in advance by the mobile terminal when disconnection other than normal disconnection occurs between the mobile terminal and the opponent terminal.

The advantages obtained by the aforementioned present invention will be described hereinbelow.

In accordance with the present invention, message is annunciated to a user to thereby urge the user to dial the first or second telephone number, when disconnection between the first mobile terminal and the first radio base station or between the second terminal and the second radio base station is detected while the first mobile terminal is in communication with the second terminal. Hence, when the first and second mobile terminal cannot make communication with each other, it is possible to connect a line between the second terminal and a terminal having the first telephone number or between the first mobile terminal and a terminal having the second telephone number, if the second terminal dials the first telephone number or the first mobile terminal dials the second telephone number. As a result, even if a line between the first mobile terminal and the second terminal is not recovered, it is possible for the first mobile terminal or the second terminal to receive message transmitted from the opponent, through a terminal having the first or second telephone number. That is, a terminal which is in a condition for making communication is able to smoothly dial a telephone number having been informed of in advance for re-connection, without any difficulty in a user.

In accordance with the present invention, it is possible to ensure stable communication between terminal users in radio signal communication system without increasing the number of radio base stations and without economic burden on a system operator.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Figure 1:
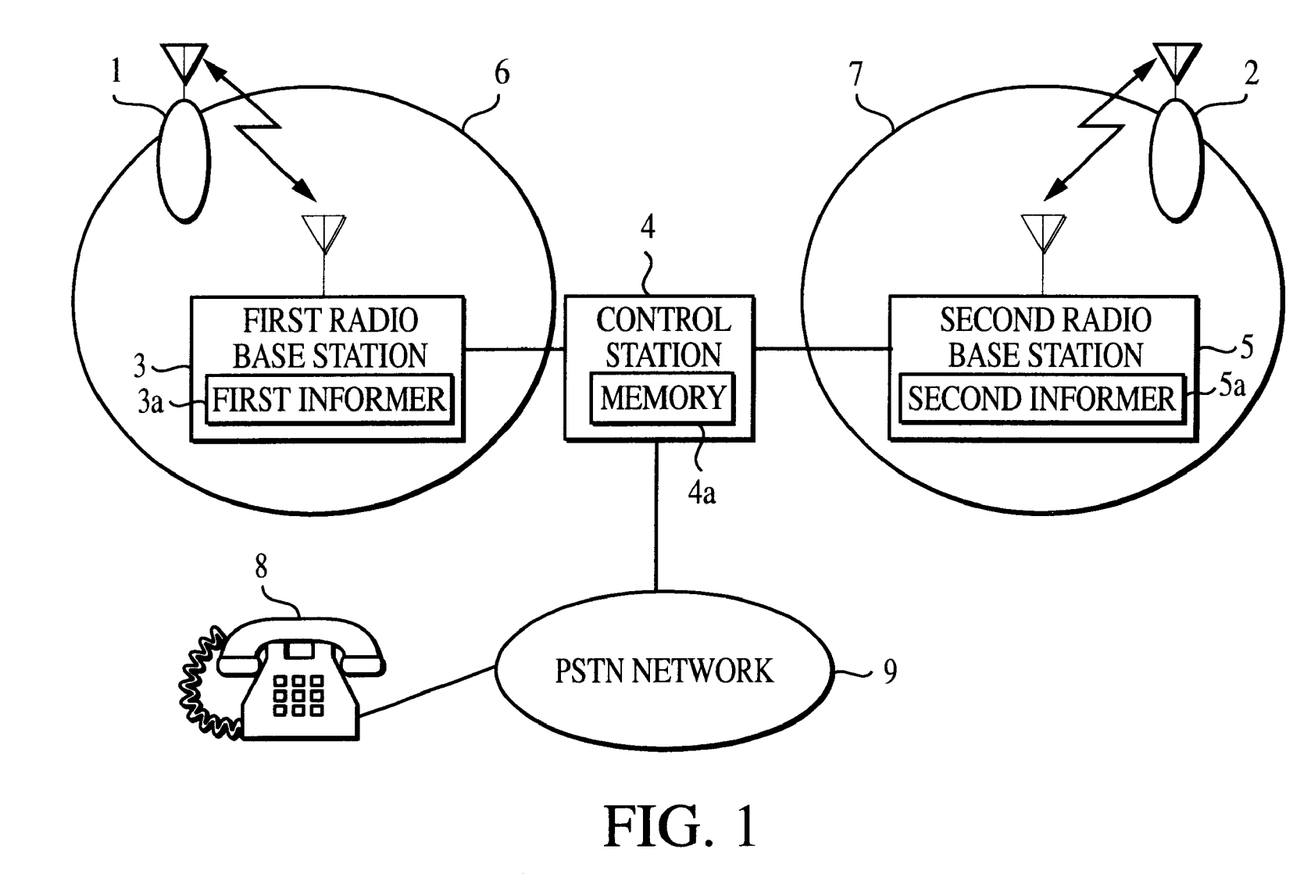
FIG. 1 is a block diagram illustrating communication system in accordance with the embodiment of the present invention.

FIG. 1 is a block diagram illustrating the communication system in accordance with the embodiment of the present invention. The communication system in accordance with the embodiment is applied to communication through terminals in so-called personal handy phone system (PHS).

In FIG. 1, a first mobile terminal 1 is comprised of a personal handy phone, and makes radio communication with a first radio base station 3. The first mobile terminal 1 can make radio communication with the first radio base station 3 only within a first communication area 6.

Similarly, a second mobile terminal 2 is comprised of a personal handy phone, and makes radio communication with a second radio base station 5. The second mobile terminal 2 can make radio communication with the second radio base station 5 only within a second communication area 7.

The first radio base station 3 is in communication with the second radio base station 5 through a control station 4.

The first radio base station 3 includes a first informer 3a which informs the control station 4 of disconnection between the first mobile terminal 1 and the first radio base station 3 when connection therebetween is interrupted.

Similarly, the second radio base station 5 includes a second informer 5a which informs the control station 4 of disconnection between the second mobile terminal 2 and the second radio base station 5 when connection therebetween is interrupted.

Communication data is transmitted between the first and second radio base stations 3 and 5 through the control station 4. The control station 4 controls operation of the first and second radio base stations 3 and 5, and includes a memory 4a in which later-mentioned first and second telephone numbers having been notified from the first and second radio base stations 3 and 5 are to be stored.

A fixed terminal 8 is comprised of an ordinary telephone, and is connected to an analog public (PSTN) network 9. The control station 4 is connected to the PSTN network 9. The first mobile terminal 1 is connected in a line to the fixed terminal 8 through the first radio base station 3, the control station 4, and the PSTN network 9. Similarly, the second mobile terminal 2 is connected in a line to the fixed terminal 8 through the second radio base station 5, the control station 4, and the PSTN network 9.

Figure 2:
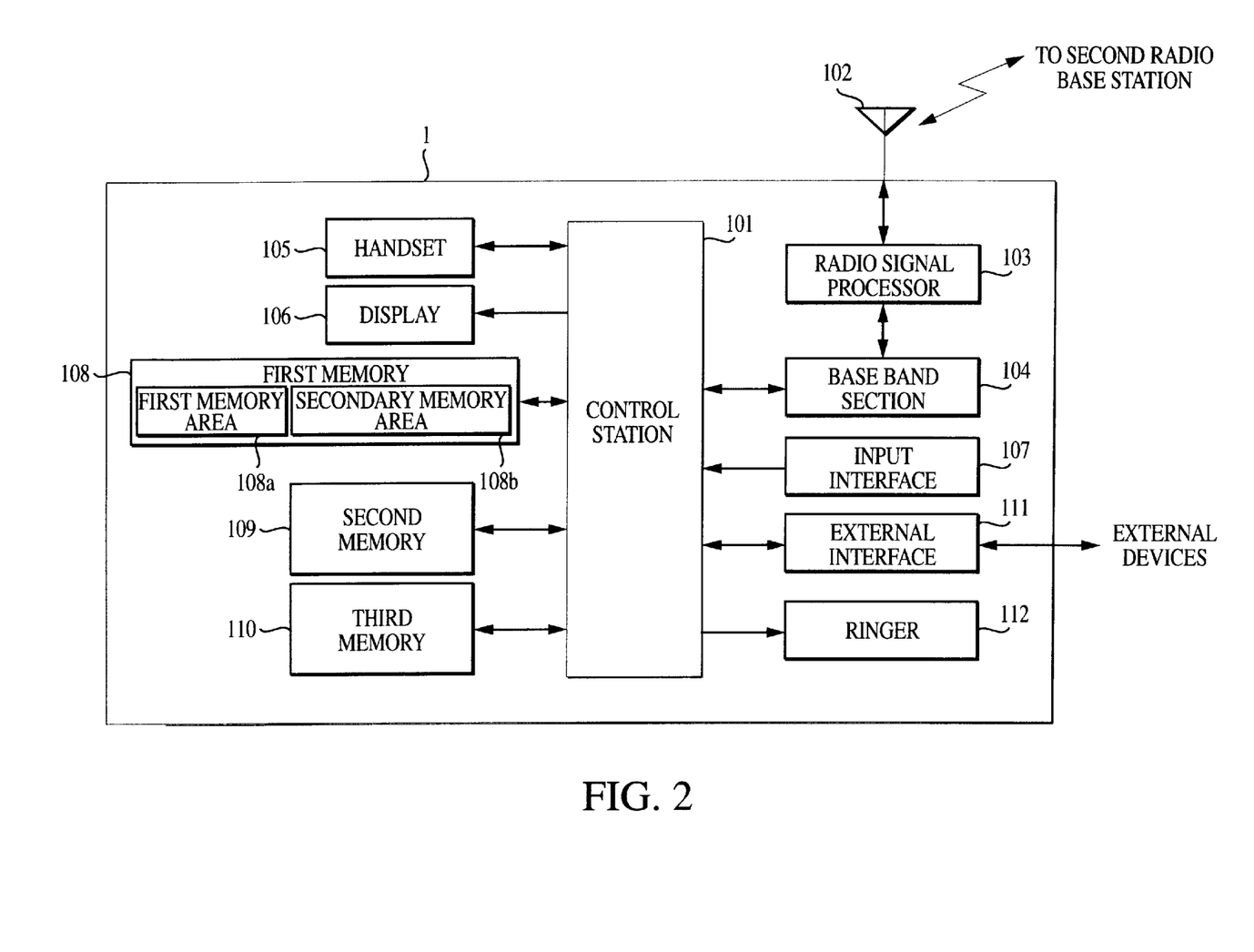
FIG. 2 is a block diagram of a mobile terminal used in the communication system illustrated in FIG. 1.

The first and second mobile terminals 1 and 2 are designed to have the same structure. Hence, hereinbelow is explained only a structure of the first mobile terminal 1. FIG. 2 is a block diagram illustrating a structure of the first mobile terminal 1.

As illustrated in FIG. 2, the first mobile terminal 1 is comprised of a controller 101 which controls operation of other components constituting the first mobile terminal 1, an antenna 102 through which the first mobile terminal 1 makes radio communication with the first radio base station 3, a radio signal processor 103 to which the antenna 102 is connected, a base band section 104, a handset 105, a display 106, an input interface 107, a first memory 108, a second memory 109, a third memory 110, an external interface 111, and a ringer 112.

The base band section 104 receives a signal from the controller 101 and transmits a base band signal to the radio signal processor 103.

The radio signal processor 103 converts the base band signal received from the base band section 104, into a signal having a frequency in a radio frequency band, and transmits radio signals to the first radio base station 3 through the antenna 102. The radio signal processor 103 receives radio signals having been transmitted from the first radio base station 3, through the antenna 102. The thus received radio signals are converted into base band signals at the base band section 104.

The handset 105 is used in voice communication. Specifically, the handset 105 carries out sound-electricity conversion to thereby convert voice of a user of the first mobile terminal 1 into electric signals, and transmits the thus converted electric signals to the controller 101 which in turn converts the electric signals into a signal format. The handset 105 carries out electricity-sound conversion for the signal format transmitted from the controller 101 to thereby reproduce voice of a user of the first mobile terminal 1.

The display 106 is comprised of a liquid crystal display device (LCD), and displays a state of the first mobile terminal 1 and characters input by a user through the input interface 107.

The input interface 107 has a plurality of keys for inputting data thereto. When a user actuates a key, the input interface 107 transmits a signal associated with the key, to the controller 101. On receipt of such a signal, the controller 101 accomplishes a function associated with the signal, such as turning a power source of the first mobile terminal 1 on or off, dialing, and inputting of letters.

The first memory 108 receives an instruction from the controller 101, and accordingly stores data therein and reads out data therefrom. The first memory 108 stores first and second telephone numbers therein. Herein, the first telephone number is defined as a telephone number to which the second mobile terminal 2 is to be re-connected when signal quality in the first mobile terminal 1 is deteriorated and accordingly a line between the first and second mobile terminals 1 and 2 is abruptly interrupted. The second telephone number is defined as a telephone number to which the first mobile terminal 1 is to be re-connected when signal quality in the second mobile terminal 2 is deteriorated and accordingly a line between the first and second mobile terminals 1 and 2 is abruptly interrupted.

The first memory 108 includes a first memory area 108a in which the first telephone number is to be stored, and a second memory area 108b in which the second telephone number is to be stored. The first telephone number is in advance input into the first mobile terminal 1 by a user through the input interface 107 or through the external interface 111.

The first mobile terminal 1 receives the first telephone number from the second mobile terminal 2 through a radio signal. The second telephone number is transmitted from the second mobile terminal 2 through the antenna 102, the radio signal processor 103, the base band section 104 and the controller 101 of the first mobile terminal 1, and then, is stored in the first memory area 108a in the first memory 108.

For instance, a telephone number of the fixed terminal 8 connected to the PSTN network 9 may be selected as the first and/or second telephone numbers.

The second memory 109 is comprised of a read only memory (ROM) and stores therein a main program used for operating the controller 101.

The third memory 110 is comprised of a random access memory (RAM). Hence, data can be written into and read out of the third memory 110. The third memory 110 is used by the controller 101 as a work area.

The external interface 111 is an interface through which the first mobile terminal 1 transmits data to and receives data from an external device. The external interface 111 selects the first telephone number in a data processing terminal of a personal computer, for instance. The first telephone number may be input to the first mobile terminal 1 through the external interface 111.

The ringer 112 receives a control signal from the controller 101 when the first mobile terminal 1 receives a call, and then, rings accordingly to thereby inform a user of a call and urge a user to hook off.

Figure 3:
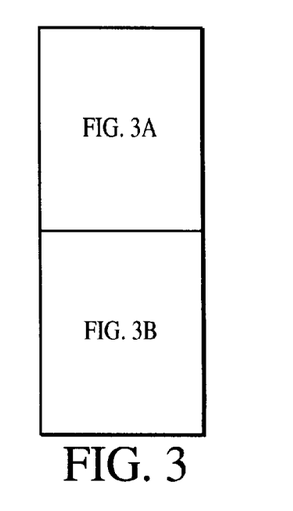
FIG. 3 is a sequence chart showing that first and second telephone numbers are informed of between first and second mobile terminals.
Figure 3A:
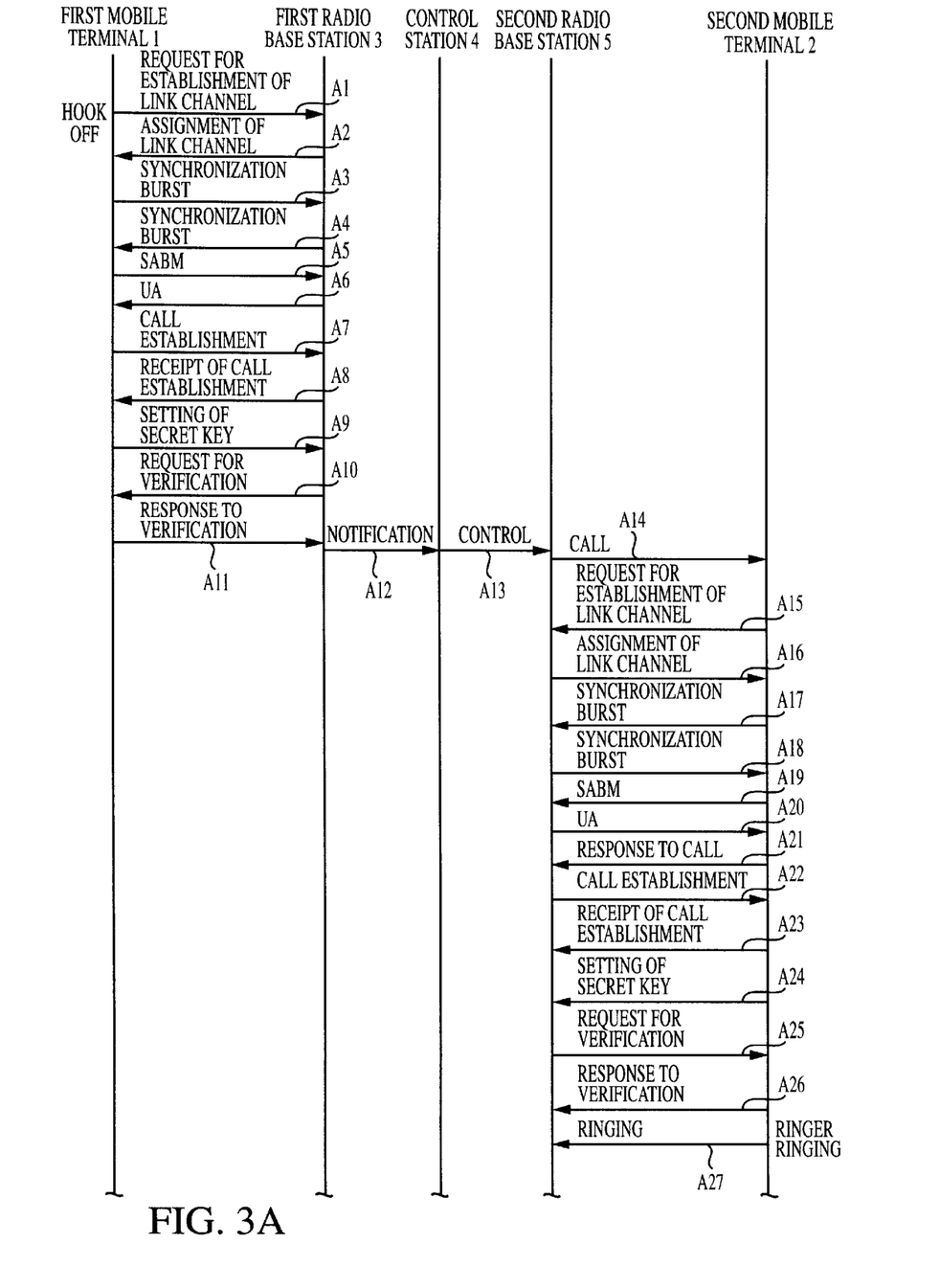
Figure 3B:
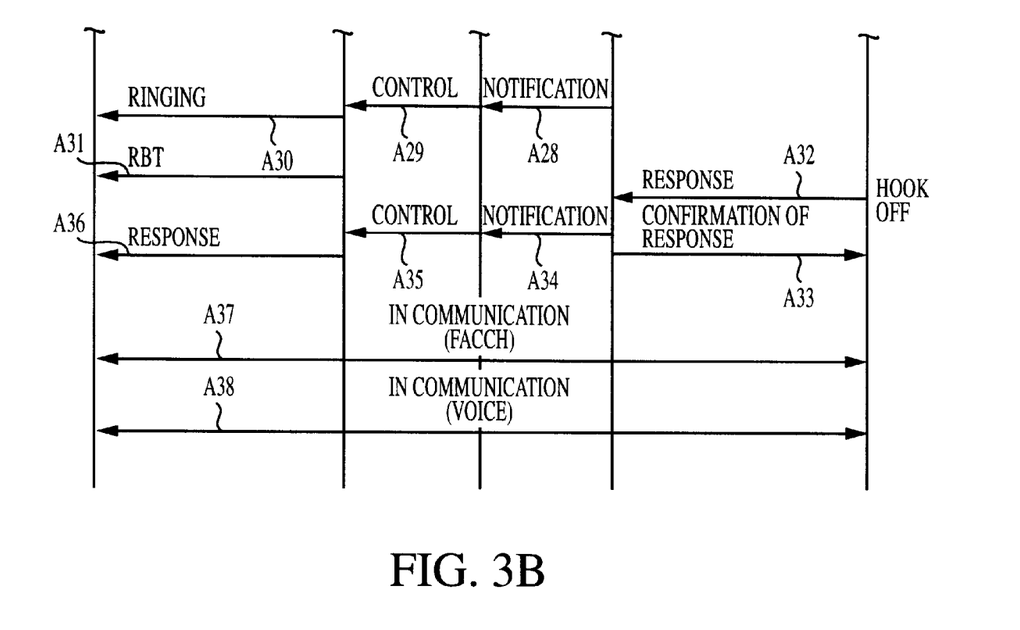
Figure 4:
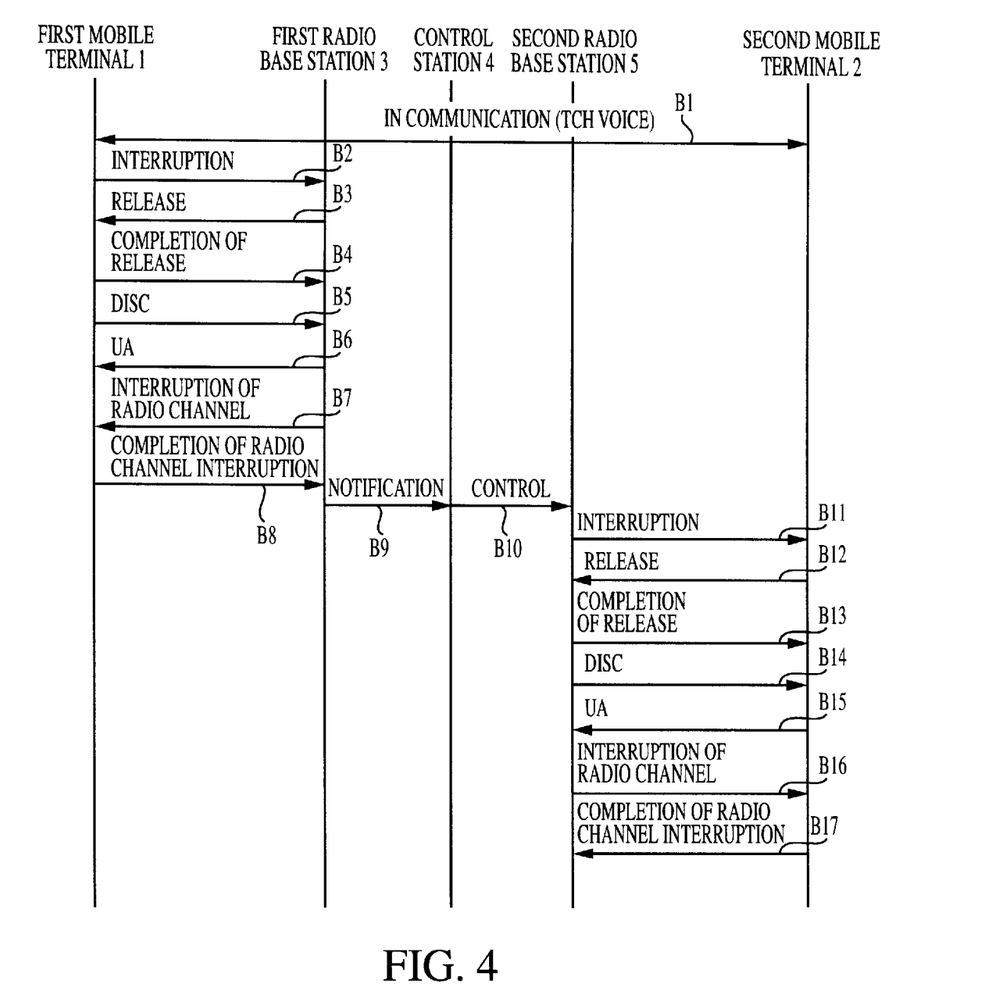
FIG. 4 is a sequence chart showing that a line between first and second terminals is interrupted.
Figure 5:
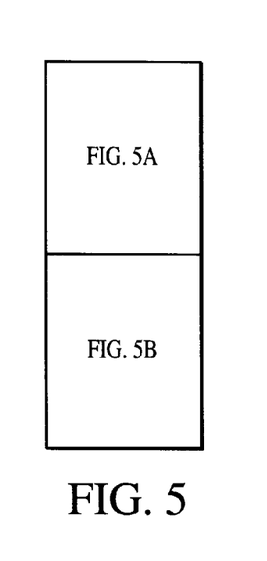
FIG. 5 is a sequence chart showing that the second terminal is re-connected to the first mobile terminal after abrupt interruption of a line.
Figure 5A:
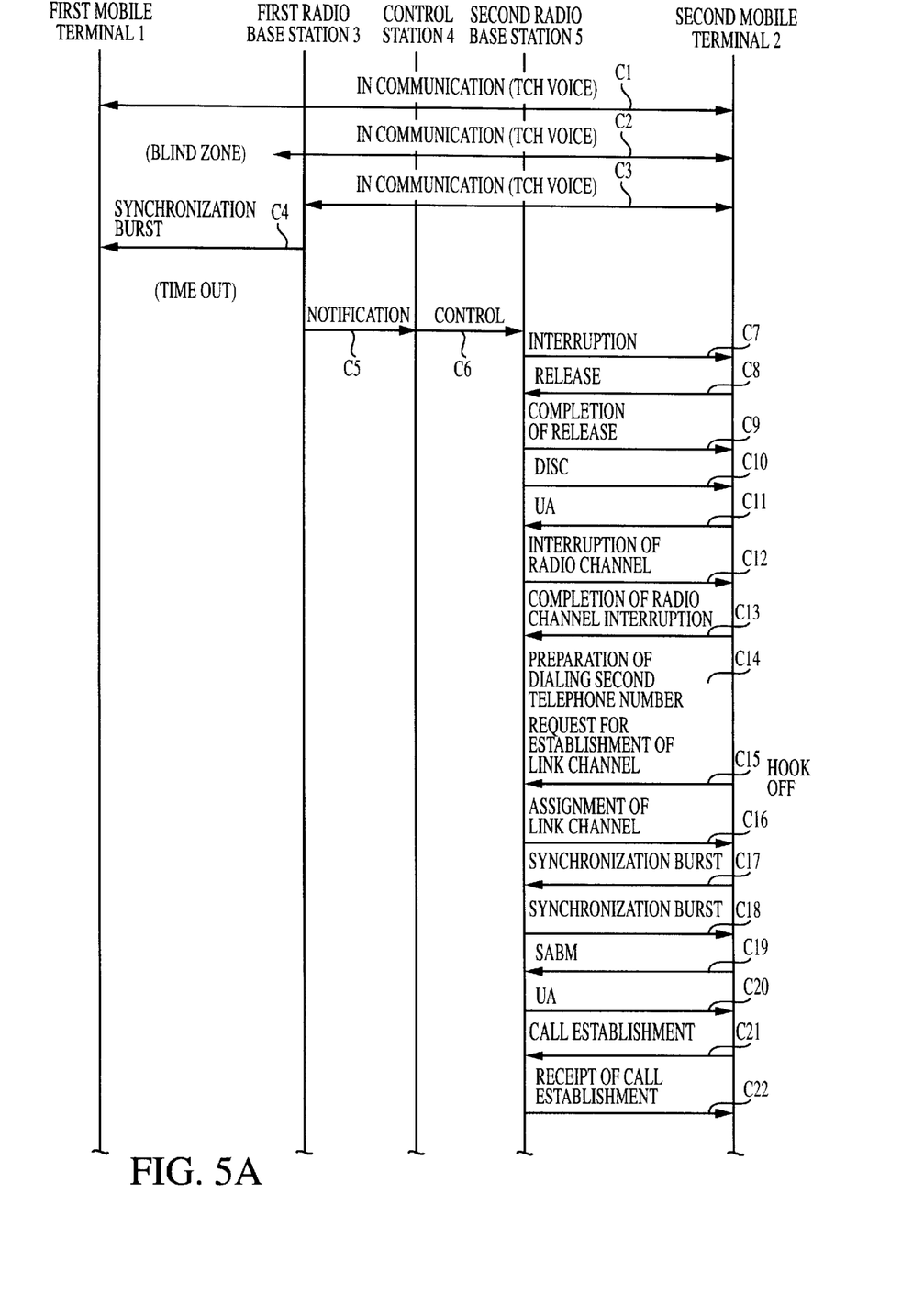
Figure 5B:
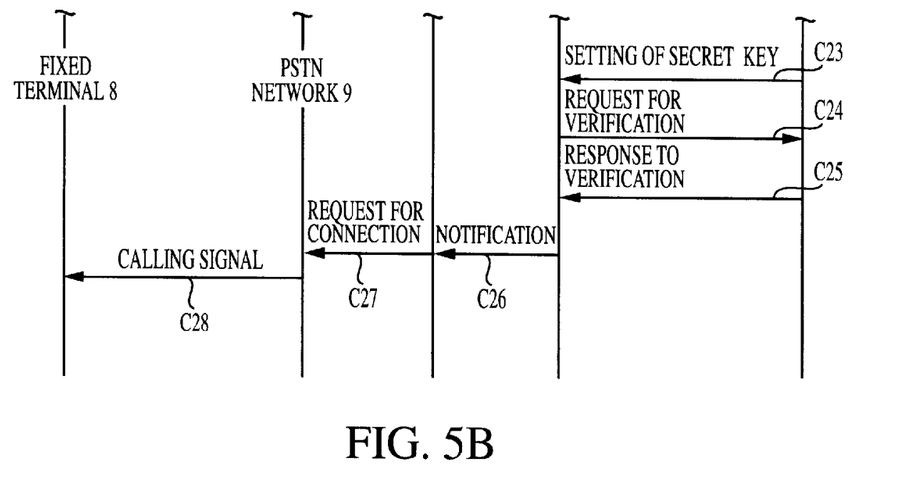

Hereinbelow is explained an operation of the communication system in accordance with the embodiment, with reference to FIGS. 2, 3, 4 and 5. FIG. 3 is a sequence chart showing that the first and second telephone numbers are informed of between the first and second mobile terminals 1 and 2. FIG. 4 is a sequence chart showing that a line between the first and second mobile terminals 1 and 2 is normally interrupted. FIG. 5 is a sequence chart showing that the second mobile terminal 2 is re-connected to the first mobile terminal 1 after abrupt interruption of a line.

It is now assumed that the first radio base station 3, the control station 4, the second radio base station 5 and the PSTN network 9 are all connected to one another, the fixed terminal 8 is connected to the PSTN network 9, the first mobile terminal 1 is located in the first communication area 6, and the second mobile terminal 2 is located in the second communication area 7.

A user of the first mobile terminal 1 stores the first telephone number in advance in the first area 108a in the first memory 108 of the first mobile terminal 1, and a user of the second mobile terminal 2 stores the first telephone number in advance in the first area 108a in the first memory 108 of the second mobile terminal 2.

It is assumed hereinbelow that the first mobile terminal 1 acts as a transmitter, and the second mobile terminal 2 acts as a receiver.

If a telephone number of the second mobile terminal 2 is input into the first mobile terminal 1 through the input interface 107, as shown in FIG. 3, the first mobile terminal 1 transmits a signal for requesting establishment of link channel, to the first radio base station 3 under control of the controller 101 of the first mobile terminal 1, in step A1.

Upon receiving the signal for requesting establishment of link channel, the first radio base station 3 transmits a link channel assigning signal to the first mobile terminal 1 in step A2. Thus, there is established link channel between the first mobile terminal 1 and the first radio base station 3.

Then, the first mobile terminal 1 transmits a synchronization burst signal to the first radio base station 3 in step A3. Upon receiving the synchronization burst signal, the first radio base station 3 transmits a synchronization burst signal to the first mobile terminal 1 in step A4. Thus, there is established synchronization between the first mobile terminal 1 and the first radio base station 3.

Then, the first mobile terminal 1 transmits a signal for requesting establishment of logic link (hereinafter, referred to simply as "SABM signal"), to the first radio base station 3 in step A5. Upon receiving the SABM signal, the first radio base station 3 transmits a signal indicating that the establishment of logic link is confirmed (hereinafter, referred to simply as "UA signal"), to the first mobile terminal 1 in step A6. Thus, there is established logic link between the first mobile terminal 1 and the first radio base station 3.

Then, the first mobile terminal 1 transmits a call establishing signal to the first radio base station 3 in step A7. Upon receiving the call establishing signal, the first radio base station 3 transmits a call establishment receipt signal to the first mobile terminal 1 in step A8. Thus, there is completed call establishment between the first mobile terminal 1 and the first radio base station 3.

The call establishing signal transmitted from the first mobile terminal 1 to the first radio base station 3 includes data about transmission sub-address. In general, transmission sub-address data is used for identifying a sub-address of a transmitter. However, the transmission sub-address data is used as data area for informing the first telephone number in the embodiment. The transmission sub-address data is of 20 bytes.

The first telephone number is stored in the first memory area 108a in the first memory 108 of the first mobile terminal 1, and is inserted into a transmission sub-address data area under a control of the controller 101. In order to make it possible for the communication system to confirm that the transmission sub-address data area is used as data area for informing the first telephone number, a user-inherent sub-address is identified by sub-address identifying bit (3 bits) included in the transmission sub-address data.

The sub-address identifying bit is defined as "010" for indicating a user-inherent sub-address, whereas the sub-address identifying bit is defined as "000" when used for informing ordinary transmission sub-address data.

Then, a secret key setting signal is transmitted from the first mobile terminal 1 to the first radio base station 3 in step A9. On receiving the secret key setting signal, the first radio base station 3 transmits a signal requesting verification, to the first mobile terminal 1 in step A10. On receiving the signal, the first mobile terminal 1 transmits a response signal to the first radio base station 3 in step A11. Thus, there is completed verification between the first mobile terminal 1 and the first radio base station 3.

After such a sequence as mentioned above has been normally completed, the first radio base station 3 informs the control station 4 of normal completion of the sequence and the first telephone number having been notified from the first mobile terminal 1, in step A12. The thus informed first telephone number is temporarily stored in the memory 4a of the control station 4.

Then, the control station 4 controls the second radio base station 5 in such a manner that such a sequence as mentioned below is carried out between the second radio base station 5 and the second mobile terminal 2, in step A13.

First, the second radio base station 5 transmits a call signal to the second mobile terminal 2 in step A14. On receiving the call signal, the second mobile terminal 2 transmits a signal for requesting establishment of link channel, to the second radio base station 5 in step A15.

Upon receiving the signal for requesting establishment of link channel, the second radio base station 5 transmits a link channel assigning signal to the second mobile terminal 2 in step A16. Thus, there is established link channel between the second mobile terminal 2 and the second radio base station 5.

Then, the second mobile terminal 2 transmits a synchronization burst signal to the second radio base station 5 in step A17. Upon receiving the synchronization burst signal, the second radio base station 5 transmits a synchronization burst signal to the second mobile terminal 2 in step A18. Thus, there is established synchronization between the second mobile terminal 2 and the second radio base station 5.

Then, the second mobile terminal 2 transmits a SABM signal to the second radio base station 5 in step A19. Upon receiving the SAMB signal, the second radio base station 5 transmits a UA signal to the second mobile terminal 2 in step A20. Thus, there is established logic link between the second mobile terminal 2 and the second radio base station 5.

After establishment of the logic link between the second mobile terminal 2 and the second radio base station 5, the second mobile terminal 2 transmits a call response signal to the second radio base station 5 in step A21.

Then, the second radio base station 5 transmits a call establishing signal to the second mobile terminal 2 in step A22. Upon receiving the call establishing signal, the second mobile terminal 2 transmits a call establishment receipt signal to the second radio base station 5 in step A23. Thus, there is completed call establishment between the second mobile terminal 2 and the second radio base station 5.

The call establishing signal transmitted from the second radio base station 5 to the second mobile terminal 2 includes data about transmission sub-address. The transmission sub-address data includes the first telephone number which has been informed of to the control station 4 from the first mobile terminal 1 through the first radio base station 3, and has been stored in the memory 4a of the control station 4, and the sub-address identifying bit.

In the embodiment, since the received sub-address identifying bit is "010", the second mobile terminal 2 as a receiver is aware that a user-inherent sub-address is assigned. Thus, the second mobile terminal 2 confirms that the transmission sub-address data area is used as data area for informing the first telephone number, and data about the transmission sub-address data area is stored in the first memory area 108a in the first memory 108 of the second mobile terminal 2, as the first telephone number of the first mobile terminal 1 as a transmitter. In addition, the second mobile terminal 2 confirms that the transmission sub-address data which the first mobile terminal 1 has indicated with the user-inherent sub-address is indicative of a terminal to which the second mobile terminal 2 can be re-connected.

Then, a secret key setting signal is transmitted from the second mobile terminal 2 to the second radio base station 5 in step A24. On receiving the secret key setting signal, the second radio base station 5 transmits a signal requesting verification, to the second mobile terminal 2 in step A25. On receiving the signal, the second mobile terminal 2 transmits a response signal to the second radio base station 5 in step A26. Thus, there is completed verification between the second mobile terminal 2 and the second radio base station 5.

After such a sequence as mentioned above has been normally completed, the second mobile terminal 2 activates the ringer 112 to ring under a control of the controller 101 to thereby inform a user of a call and urge a user to hook off.

The second mobile terminal 2 transmits a call signal to the second radio base station 5 in step A27 for informing that the ringer 112 is now ringing in the second mobile terminal 2. On receiving the call signal, the second radio base station 5 transmits a signal to the control station 4 in step A28. On receiving the signal, the control station 4 controls the first radio base station 3 to transmit a call signal to the first mobile terminal 1 in steps A29 and A30.

On receiving the call signal from the first radio base station 3, the first mobile terminal 1 is put into a stand-by mode, in which the first mobile terminal 1 is waiting for a response signal. At the same time, the first radio base station 3 transmits ring back tone (RBT) to the first mobile terminal 1 in step A31. A user of the first mobile terminal 1 becomes aware that the second mobile terminal 2 is now ringing, by hearing RBT through the handset 105.

Thereafter, when the controller 101 is informed that a user of the second mobile terminal 2 has hooked off through the input interface 107, the controller 101 of the second mobile terminal 2 stops the ringer 112 to ring. At this time, the second mobile terminal 2 transmits a response signal to the second radio base station 5 in step A32. On receiving the response signal, the second radio base station 5 transmits a response confirmation signal to the second mobile terminal 2 in step A33, thereby the second mobile terminal 2 being transferred into a condition where the second mobile terminal 2 can make communication.

The response signal having been transmitted from the second mobile terminal 2 is also transmitted from the second radio base station 5 to the first radio base station 3 through the control station 4 in steps A34 and A35. Then, the response signal is transmitted from the first radio base station 3 to the first mobile terminal 1 in step A36. Thus, the first mobile terminal 1 is also transferred into a condition where the first mobile terminal 1 can make communication.

When a line between the first mobile terminal 1 and the second mobile terminal 2 has been established, the second mobile terminal 2 transmitted the second telephone number to the first mobile terminal 1 in step A37 through the use of fast associated control channel (FACCH) in which communication channel (TCH) is temporarily stolen. The second telephone number is data stored in the first memory area 108a in the first memory 108 of the second mobile terminal 2, and is inserted into data bit area in FACCH under a control of the controller 101.

Data bit in FACCH is of 136 bits, which is almost equal in bit to transmission sub-address data (20 bytes=160 bits). That is, it is possible to deal with 17 characters in a 1-byte letter, namely, a telephone number in 17 orders in one frame of FACCH.

Data in data bit in FACCH having been transmitted from the second mobile terminal 1 to the first mobile terminal 1 just after communication had started is stored in the second memory area 108b in the first memory 108 of the first mobile terminal as the second telephone number of the second mobile terminal as a receiver.

When the above-mentioned sequence has been completed, the first and second mobile terminals 1 and 2 are transferred into an ordinary communication state by TCH in step A38.

In communication, voice is converted into an audio signal by means of the handset 105, and further converted into a base band signal in a certain format by means of the base band section 104. Then, the base band signal is converted into a signal in a predetermined radio frequency band by means of the radio signal processor 103, and then, is transmitted to a radio base station as a radio signal through the antenna 102.

On the other hand, a signal in a radio frequency band, having been received at the radio signal processor 103 through the antenna 102 is converted into a base band signal, and further converted by the base band section 104 into a signal level which the controller 101 can process, and still further converted into a signal format by the controller 101. Then, the signal is input into the handset 105, and converted into voice, which is transmitted through the handset 105 to a user.

Hereinbelow is explained an operation for intentionally interrupting a line after communication has been finished, with reference to FIG. 4. FIG. 4 shows the sequence in which a terminal as a transmitter intentionally interrupts a line. It is now assumed that communication is normally made between the first and second mobile terminals 1 and 2.

While communication is normally being made in step B1, when the first mobile terminal 1 transmits an interruption signal to the first radio base station 3 in step B2, the first radio base station 3 transmits a release signal to the first mobile terminal 1 in step B3. In response to the release signal, the first mobile terminal 1 transmits a release-completed signal to the first radio base station 3 in step B4.

Then, the first mobile terminal 1 transmits a call interrupting signal (DISC signal) to the first radio base station 3 in step B5. On receiving the call interrupting signal, the first radio base station 3 transmits a UA signal to the first mobile terminal 1 in step B6. Thus, logic link between the first mobile terminal 1 and the first radio base station 3 is interrupted.

Then, the first radio base station 3 transmits a radio channel interruption signal to the first mobile terminal 1 in step B7. On receiving the radio channel interruption signal, the first mobile terminal 1 transmits a signal indicating that radio channel interruption has been completed, to the first radio base station 3 in step B8. Thus, interruption of a call has been completed between the first mobile terminal 1 and the first radio base station 3.

When the control station 4 is notified from the first radio base station 3 that interruption of a call has been completed, in step B9, the control station 4 transmits an instruction to the second radio base station 5 to interrupt a call in step B10. On receiving the instruction, the second radio base station 5 carries out the sequence comprising the steps B2 to B8, to thereby interrupt a call between the first mobile terminal 1 and the first radio base station 3 in steps B11 to B17.

Hereinbelow is explained an operation to be carried out when abrupt interruption occurs in a line while communication is being made. In a case where there occurs an accident in a radio line, and hence a radio line is abruptly interrupted, it would be impossible to carry out the sequence to be carried out when a line is normally interrupted, as illustrated in FIG. 4, and hence, a sequence for re-connection as illustrated in FIG. 5 is carried out.

FIG. 5 illustrates a case in which a transmitter terminal goes out of a communication area while communication is being made between a transmitter terminal and a radio base station. It is assumed that a transmitter terminal consists of the first mobile terminal 1 illustrated in FIG. 1, and a radio base station with which the transmitter terminal makes communication consists of the first radio base station 3 illustrated in FIG. 1.

It is now assumed that normal communication is being made between the first mobile terminal 1 and the second mobile terminal 2 in step C1. While normal communication is being made, the first mobile terminal 1 and the first radio base station 3 continually checks a radio line by monitoring slot errors in effective slots in radio signals transmitted or received therebetween in a radio signal zone.

If the first mobile terminal 1 moves out of the first communication area 6 only in which the first mobile terminal 1 can make communication with the first radio base station 3, in step C2, slot error is continuously monitored in the first mobile terminal 1. If the first mobile terminal 1 monitors continuous slot error for more than a predetermined period of time, the first mobile terminal 1 temporarily stops transmission of radio signals to the first radio base station 3 until such a state is recovered, in step C3.

When the first radio base station 3 is aware that transmission of radio signals from the first mobile terminal 1 is ceased, the first radio base station 3 temporarily terminates communication with the control station 4 to thereby avoid the second mobile terminal 2 from being influenced, and concurrently, starts transmitting a synchronization burst signal to the first mobile terminal 1 to thereby attempt re-establishment of TCH, that is, re-starting communication, in step C4.

If interruption in transmission of radio signals from the first mobile terminal 1 has continued for more than a predetermined period of time, the first radio base station 3 determines that it is impossible to recover such interruption, and then starts the sequence for line disconnection.

First, the first radio base station 3 informs the control station 4 of releasing call interruption, and further, informs the control station 4 that the first radio base station 3 disconnects a line for the reason that interruption in transmission of radio signals from the first mobile terminal 1 has continued for more than a predetermined period of time, in step C5.

Then, the control station 4 informs the second radio base station 5 of disconnection of a line and the reason therefor in step C6. Thereafter, the second radio base station 5 starts a line disconnection sequence, which is the same as the line disconnection sequence having been explained with reference to FIG. 4, to the second mobile terminal 2 in steps C7 to C13. In the line disconnection sequence, the second radio base station 5 informs the second mobile terminal 2 of the reason for disconnection of a line.

If the reason for the disconnection of a line is other than normal disconnection, the second mobile terminal 2 is transferred into a mode for giving a call to a telephone number to be re-connected, after the sequence of disconnecting a line from the second radio base station 5 has been completed.

Specifically, the controller 101 of the second mobile terminal 2 analyzes whether the disconnection is normal disconnection or disconnection caused by other reasons, based on the reason for disconnection of a line. If the controller 101 of the second mobile terminal 2 judges that the disconnection of a line is not normal disconnection, the controller 101 reads the first telephone number out of the first memory area 108a in the first memory 108, and displays the thus read out second telephone number in the display 106. In addition, the controller 101 transmits voice message into the handset 105 to urge a user to dial the second telephone number. Thus, the second mobile terminal 2 is in a stand-by mode in which the second mobile terminal 2 waits for an input through a transmission key or a transmission-stop key in the input interface 107 in step C14.

The voice message for urging a user to dial the first telephone number is stored in the second memory 109. An example of the voice message is as follows: "Communication cannot be continued because an opponent terminal moves into a blind zone, or power in an opponent terminal is in short. You can re-connect to the telephone number XX-XXX-XXX. (You can leave a message in the caretaker center.) Do you re-connect? If you re-connect, push a communication button, or wait without any action. If you do not re-connect, hook off the telephone by pushing a communication stop button."

If the controller 101 of the second mobile terminal 2 receives an input through the transmission-stop button in the input interface 107, the controller 101 stops displaying the first telephone number in the display 106 and transmitting the voice message such as the above-mentioned one to the handset 105. In addition, the controller 101 releases a mode for giving a call to the first telephone number, and transfers into a stand-by mode.

On the other hand, if the controller 101 of the second mobile terminal 2 receives an input through the transmission key in the input interface 107, or if the controller 101 receives no inputs for more than a predetermined period of time, the controller 101 displays in the display 106 that the second mobile terminal 2 is dialing the first telephone number, and actually starts dialing the first telephone number.

FIG. 5 shows an example of a sequence of a call in the case that a telephone number of the fixed terminal 8 connected to the PSTN network 9 illustrated in FIG. 1 is selected as the first telephone number.

First, the second mobile terminal 2 transmits a signal for requesting establishment of link channel, to the second radio base station 5 under control of the controller 101 of the second mobile terminal 2, in step C15.

Upon receiving the signal for requesting establishment of link channel, the second radio base station 5 transmits a link channel assigning signal to the second mobile terminal 2 in step C16. Thus, there is established link channel between the second mobile terminal 2 and the second radio base station 5.

Then, the second mobile terminal 2 transmits a synchronization burst signal to the second radio base station 5 in step C17. Upon receiving the synchronization burst signal, the second radio base station 5 transmits a synchronization burst signal to the second mobile terminal 2 in step C18. Thus, there is established synchronization between the second mobile terminal 2 and the second radio base station 5.

Then, the second mobile terminal 2 transmits a SABM signal to the second radio base station 5 in step C19. Upon receiving the SAMB signal, the second radio base station 5 transmits a signal indicating that a UA signal to the second mobile terminal 2 in step C20. Thus, there is established logic link between the second mobile terminal 2 and the second radio base station 5.

Then, the second mobile terminal 2 transmits a call establishing signal to the second radio base station 5 in step C21. Upon receiving the call establishing signal, the second radio base station 5 transmits a call establishment receipt signal to the second mobile terminal 2 in step C22. Thus, there is completed call establishment between the second mobile terminal 2 and the second radio base station 5.

Then, a secret key setting signal is transmitted from the second mobile terminal 2 to the second radio base station 5 in step C23. On receiving the secret key setting signal, the second radio base station 5 transmits a signal requesting verification, to the second mobile terminal 2 in step C24. On receiving the signal, the second mobile terminal 2 transmits a response signal to the second radio base station 5 in step C25. Thus, there is completed verification between the second mobile terminal 2 and the second radio base station 5.

After such a sequence as mentioned above has been normally completed, the second radio base station 5 informs the control station 4 of normal completion of the sequence and a signal informing of a call in step C26. In response, the control station 4 transmits a signal requesting to connect a line to the first telephone number, to the PSTN network 9 in step C27. In response, the PSTN network 9 transmits a calling signal to the fixed terminal 8, and thus, the fixed terminal 8 receives a call in step C28.

The first mobile terminal 1 continues receiving a synchronization burst signal transmitted from the first radio base station 3, to thereby monitor slot error. If the slot error is continuously monitored for more than a predetermined period of time, namely, more than a period of time necessary for the first radio base station 3 to judge that communication is not able to be recovered after interruption of a line has been detected, the controller 101 of the first mobile terminal 1 judges that it is no longer possible to re-establish a line, and ends an operation for making communication.

Thereafter, the controller 101 of the first mobile terminal 1 reads out the second telephone number having been stored in the first memory area 108a in the first memory 108, and then, displays the thus read out second telephone number in the display 106, and transmits voice message to the handset 105 to thereby urge a user to dial the second telephone number.

Thus, the first mobile terminal 1 is in a stand-by mode in which the first mobile terminal 1 waits for an input through a transmission key or a transmission-stop key in the input interface 107.

The voice message for urging a user to dial the second telephone number is stored in the second memory 109. An example of the voice message is as follows: "Communication cannot be continued because this terminal moves into a blind zone. The opponent terminal may be re-connected to the telephone number XX-XXX-XXX. (The opponent terminal may leave a message in the caretaker center.) Do you re-connect? If you re-connect, wait without any action. If you do not re-connect, hook off the telephone by pushing a communication stop button."

When a user of the first mobile terminal 1 confirms as to whether a user of the second mobile terminal 2 leaves a message, the controller 101 of the first mobile terminal 1 starts calling, if a predetermined period of time has passed without any action being taken to the first mobile terminal 1. This is because it would take some time for a user of the second mobile terminal 2 to dial the fixed terminal 8 and leave a message.

If the controller 101 of the first mobile terminal 1 receives an input through the transmission-stop button in the input interface 107, the controller 101 stops displaying the second telephone number in the display 106 and transmitting the voice message such as the above-mentioned one to the handset 105. In addition, the controller 101 releases a mode for giving a call to the second telephone number, and transfers into a stand-by mode.

As mentioned so far, in accordance with the above-mentioned embodiment, even if there occurs abrupt interruption in a line between the first and second mobile terminals 1 and 2 while communication is being made therebetween, it would be possible for a user of the first mobile terminal 1 to know a message of a user of the second mobile terminal 2 through the fixed terminal 8 without increasing the number of radio base stations, even though a line between the first and second mobile terminals 1 and 2 is not recovered. That is, a terminal which is in a state where a line is stable can smoothly dial or re-connect to a telephone number having been informed of in advance.

Though the above-mentioned embodiments mentions disconnection in a line between the first mobile terminal 1 and the first radio base station 3, if disconnection in a line between the second mobile terminal 2 and the second radio base station 5 occurs, the first mobile terminal 1 can be re-connected to the second telephone number by carrying out the sequence as mentioned above for re-connection, because the first and second mobile terminals 1 and 2 inform each other of a telephone number for re-connection.

In the above-mentioned embodiment, the first and second mobile terminals 1 and 2 are to be re-connected to the fixed terminal 8. By using a telephone with a function of a so-called caretaker as the fixed terminal 8, a user of the second mobile terminal 2 can leave a message in the fixed terminal 8, even if a user of the fixed terminal 8 does not manually respond to a call from the first or second mobile terminal 1 or 2. Thus, a user of the first mobile terminal 1 can receive a message from a user of the second mobile terminal 2 by dialing the fixed terminal 8 through another fixed terminal or by directly dialing the fixed telephone 8 when a user of the first mobile terminal 1 returns into the first communication area 6. The above-mentioned embodiment ensures users of a mobile terminal to transmit information to or receive information from each other.

The above-mentioned embodiment can be applied to a telephone to which so-called caretaker telephone service is served. Herein, the caretaker telephone service indicates service which is provided by a communication system operator to a mobile terminal user and in which the operator temporarily keeps voice message transmitted from a mobile terminal user. Hereinbelow is explained an example in which the above-mentioned embodiment is applied to a telephone with a function of caretaker telephone service.

It is now assumed that the first mobile terminal 1 illustrated in FIG. 1 receives so-called caretaker telephone service, and stores a telephone number of itself in the first memory area 108a in the first memory 108 as the first telephone number. If the first mobile terminal 1 moves out of the first communication area 6, and hence, is no longer able to make communication with the first radio base station 3 after the first and second mobile terminals 1 and 2 have started communication with each other through a radio line, the second mobile terminal 2 dials the telephone number of the first mobile terminal 1 as a telephone number to be re-connected.

If the first mobile terminal 1 is kept in a condition wherein the first mobile terminal 1 cannot receive a call, a call from the second mobile terminal 2 is transferred and connected to the caretaker telephone service center with which the first mobile terminal 1 makes contract. Hence, a user of the second mobile terminal 2 can leave a message in the caretaker telephone service center. In doing so, a user of the second mobile terminal 2 can omit steps of re-dialing and calling back.

The above-mentioned embodiment can be applied to fixed terminals one of which is connected to the PSTN network 9, as well as personal handy telephone system. In the application to fixed terminals, the sequence for transmitting data about a telephone number to be re-connected, to be carried out between the fixed terminal 8 and the PSTN network 9, is different from the sequence to be carried out between the first mobile terminal 1 and the first radio base station 3. Similarly to so-called telephone number display service, data about a telephone number to be re-connected is transmitted in a data transmitting system in which a modem is employed between the PSTN network 9 and the fixed terminal 8.

The above-mentioned embodiment is not to be limited to application for informing a telephone number for re-connection, but can be applied to a system in which an communication operator gives a call to a mobile terminal user, and data stored in the mobile terminal is remotely controlled through a radio line. However, the mobile terminal to be used in such application is designed to have a structure different from the structure illustrated in FIG. 2, but suitable for steps of giving a call from a communication operator to a mobile terminal user, and remotely controlling data stored in the mobile terminal through a radio line.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 10-295188 filed on Oct. 16, 1998 including specification, claims, drawings and summary is incorporated herein by reference in its entirety.

What is claimed is:

1. A mobile terminal which makes radio communication with a radio base station and also makes radio communication with an opponent terminal in mobile network or in public network through a control station to which said radio base station is connected, comprising:

(a) a memory including a first area in which a first telephone number is to be stored and a second area in which a second telephone number is to be stored, said first telephone number being determined by a user of said mobile terminal at his/her discretion and being defined as a telephone number to which said opponent terminal is re-connected when it becomes impossible for said opponent terminal to make communication with said mobile terminal, said second telephone number being determined by a user of said opponent terminal at his/her discretion and being defined as a telephone number to which said mobile terminal is re-connected when it becomes impossible for said mobile terminal to make communication with said opponent terminal;

(b) a controller which (b1) transmits said first telephone number to said radio base station when said mobile terminal makes communication with said radio base station, (b2) stores said second telephone number in said second area which number has been transmitted from said opponent terminal after said mobile terminal has been connected to said opponent terminal, (b3) controls said mobile terminal to start communication with said opponent terminal after said second telephone number has been stored in said second area, and (b4) temporarily stops transmitting radio signals to said radio base station when slot error has continued for a predetermined period of time in signals received from said radio base station, and (c) an annunciator which annunciates information to a user of said mobile terminal to thereby urge a user of said mobile terminal to dial said second telephone number, when informed from said radio base station that disconnection between said mobile terminal and said opponent terminal is other than normal disconnection.

2. The mobile terminal as set forth in claim 1, wherein said controller controls said mobile terminal to dial said second telephone number without being handled to do so, when a predetermined period of time has passed after said information has been annunciated.

3. The mobile terminal as set forth in claim 1, wherein said controller inserts said first telephone number into sub-address data included in a signal for giving a call, transmits a user-inherent sub-address indicated by a sub-address identifying bit for informing that said sub-address data is used as an area for indicating said first telephone number, and extracts said second telephone number out of received data bit of a control channel to thereby store the thus extracted second telephone number in said second area.

* * * * *